June 24, 1930.  H. BRYANT  1,765,651
FITTING FOR TUBULAR STRUCTURES
Filed June 25, 1923   2 Sheets-Sheet 1
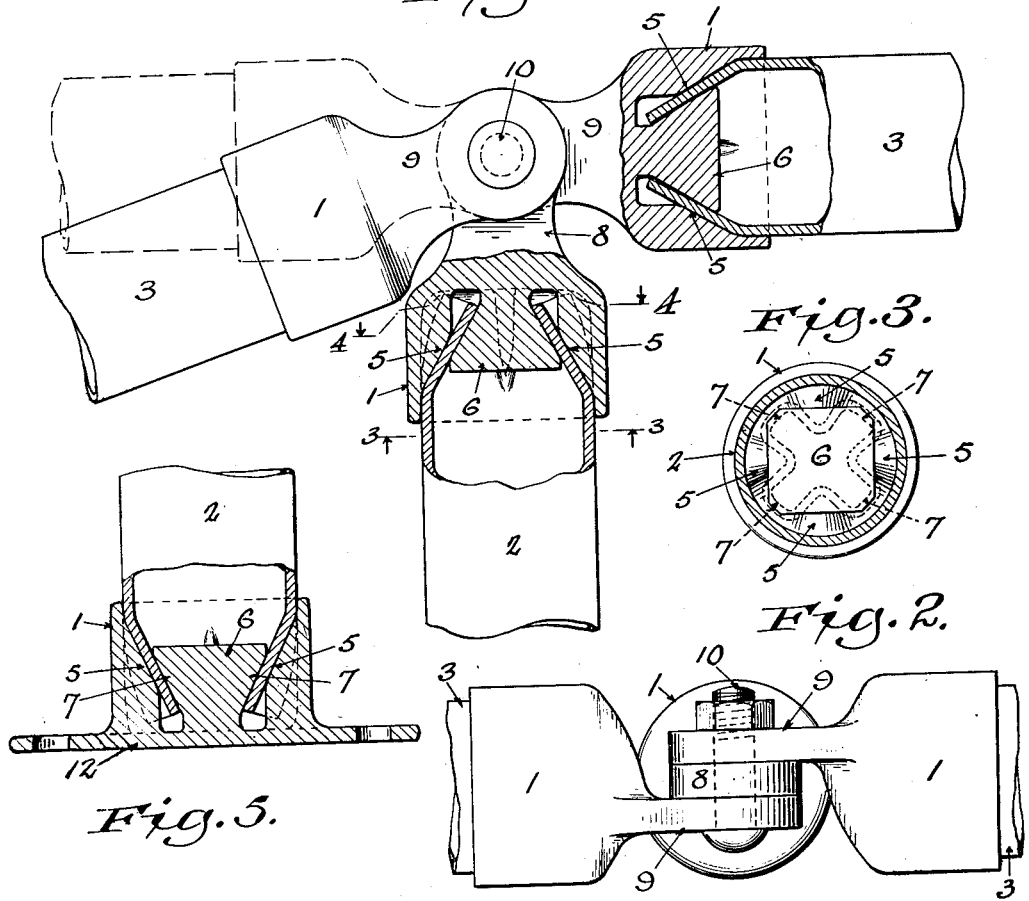
INVENTOR:
Henry Bryant,
BY
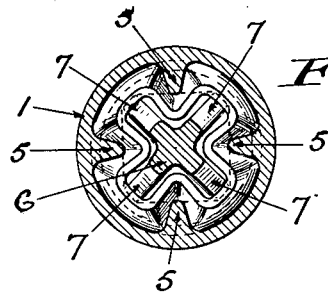
ATTORNEYS.

June 24, 1930.  H. BRYANT  1,765,651
FITTING FOR TUBULAR STRUCTURES
Filed June 25, 1923  2 Sheets-Sheet 2
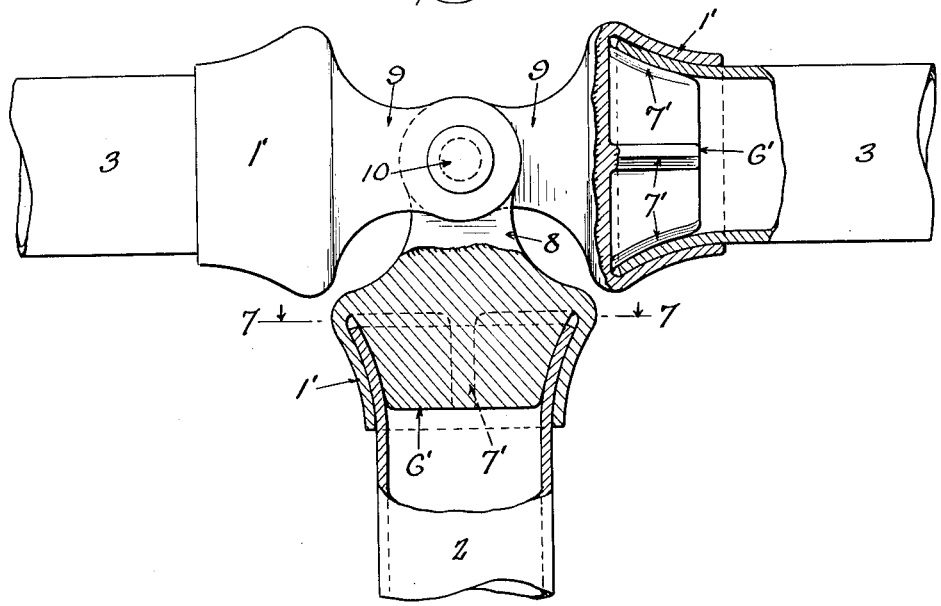
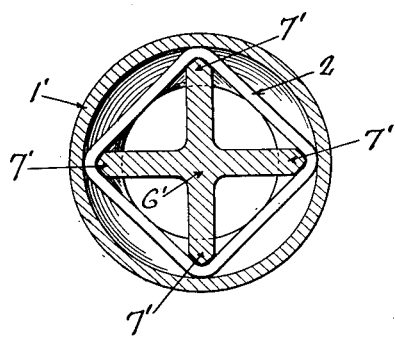 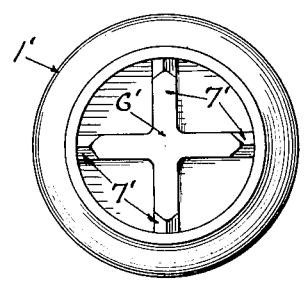
INVENTOR:
Henry Bryant,
BY
Bottum, Hucknall, Lecher McNamara
ATTORNEYS.

Patented June 24, 1930

1,765,651

UNITED STATES PATENT OFFICE

HENRY BRYANT, OF WAUKESHA, WISCONSIN

FITTING FOR TUBULAR STRUCTURES

Application filed June 25, 1923. Serial No. 647,489.

This invention relates to articles or structures made mainly or partly of metal pipes or tubes, such as fence and other posts, rails and braces.

Its main objects are to improve and facilitate the construction and erection of such articles and structures.

It consists in the construction of fittings as hereinafter particularly described and pointed out in the claims.

In the accompanying drawing like characters designate the same parts in the several figures.

Figure 1 is a view partly in side elevation and partly in section, of fiittings embodying the invention and specially designed for connecting a post and top rails of a fence or similar structure; Fig. 2 is a plan view of the three fittings shown in Fig. 1; Fig. 3 is a cross section on the line 3—3, Fig. 1, and an inverted end view of the middle fitting; Fig. 4 is a cross section on the line 4—4, Fig. 1; Fig. 5 is a sectional detail view of a fitting embodying the invention and specially designed for the attachment of a tubular post or rail to a floor, pavement or wall; Fig. 6 is a view similar to Fig. 1, showing a modification of the fittings as designed for connecting top rails with a post of a fence or the like; Fig. 7 is a cross section on the line 7—7, Fig. 1; and Fig. 8 is an elevation of the socket end of one of the fittings shown in Fig. 6.

Referring to Figs. 1 to 4 inclusive, showing one of the preferred construction of fittings embodying the present invention as specially designed for fences and similar structures, each fitting 1, which may be made of malleable iron, is formed with a socket to receive the end of a pipe or tube section such as a post 2, or a rail 3. The opposing walls or parts of the socket are inclined inwardly with respect to the axis of the fitting and of the pipe or tube section attached thereto towards the closed end of the socket.

In the present case the outer wall of each socket is formed with inwardly projecting ribs 5, inclined inwardly towards the axis of the fitting and closed end of the socket, the ribs terminating a short distance from the opening into the socket, which is of circular form corresponding with the outside diameter of the pipe or tube section to which it is applied.

The inner wall of the socket, which is of approximately annular shape, is formed by a central core 6 preferably cast with the fitting and longitudinally ribbed or fluted, as clearly shown in Fig. 4. The outwardly projecting ribs 7 of the core, which alternate with the ribs 5 on the outer wall of the socket, are inclined inwardly towards the axis of the fitting and the closed end of the socket, as clearly shown in Fig. 1, the recesses between the ribs 7 diminishing in depth towards the outer end of the core 6, and the recesses between the ribs 5 diminishing in depth towards the outer end of the socket and merging with the annular opening into the socket.

The fitting is forced axially by a powerful hydraulic or other press into place on the end of a pipe or tube section, to which it is to be permanently attached, the end of the tube within the socket being fluted and bent inwardly by the opposing inclined ribs 5 and 7, into permanent interlocking engagement with the fitting.

When the fitting is thus forced into place on the end of a tube or pipe it forms a practically water-tight closure, which excludes moisture and prevents the tube or pipe from rusting inside.

When the fittings are to be used for connecting the members of a structure such as the posts and rails of a fence or the like, as shown in Fig. 1, they are formed with ears 8 and 9, the ears 8 on the fittings attached to the posts 2, being centrally located while the ears 9 on the fittings attached to the rails 3 are offset as shown in Fig. 2, so that when they are fastened by bolts 10 to opposite sides of the ears 8, the rails 3 will be in axial alignment, or their axes will be in the same vertical plane, as shown in Fig. 2.

The tubular members of the fence or the like, being provided in a factory with fittings, as shown in Fig. 1, can be easily bundled, tied and fastened together in the smallest possible compass for convenient and economical storage and shipment, and can be easily and quickly assembled in the erection of a fence or other structure on the field, by simply placing them in position, inserting the bolts 10 and tightening the nuts on the bolts.

For fence posts which are not be connected with top rails, as shown in Figs. 1 and 2, and for other posts, poles or standards, such as clothes line posts, flag poles, sign standard, etc., the fittings are made without the ears, and serve as terminals or finishing caps and closures, or as heads for driving posts into the ground with a maul or sledge, and thus preventing injury to the tubing or piping.

Referring to Fig. 5, the fitting, in place of an ear, as shown in Fig. 1, is formed with an attachment plate 12, for fastening it with the tube or pipe section attached to it, to a floor, pavement, wall or the like.

Referring to Figs. 6, 7 and 8, showing fittings of a modified construction as specially designed for connecting members of a tubular structure such as the top rails, with a post of a fence, each fitting 1' is formed with an approximately annular socket to receive the end of a pipe or tube section such as a post 2, or a rail 3. The opposing walls or parts of the socket are in this case inclined outwardly relative to the axis of the fitting and of the pipe or tube section attached thereto towards the closed end of the socket, instead of being inclined inwardly, as shown in Figs. 1 and 5.

The core 6', having ribs 7', the outer edges of which are inclined outwardly towards the closed end of the socket, constitutes in this form of fitting, an expanding member, and the outwardly inclined or flaring outer wall of the socket which extends at its open end beyond the core, need not be provided with inwardly projecting ribs, like the other form shown in Figs. 1 and 5.

When a fitting of this form is forced into place on a tube or pipe section, the ribs 7' force the end of the tube or pipe at intervals outwardly into interlocking engagement with the outer flaring or inclined wall of the socket, forming outwardly bent folds or longitudinal ribs in the tube or pipe of gradually increasing depth towards its end, as shown in Figs. 6 and 7.

This form of the fitting, designed to crimp or flute and expand the end of the tube or pipe into fast engagement therewith, when they are forced together, like the other form shown in Figs. 1 and 5, designed to crimp or flute and contract the end of a tube or pipe into fast engagement therewith when they are forced together, may be variously modified as to its external shape, to adapt it to the various uses to which it is applicable.

With either of the constructions shown, the fitting is rigidly and permanently attached to a tube or pipe without screwthreading either part, and affords means for easily and quickly assembling and connecting the members of various tubular structures, such as fences, standards, towers, etc.

Various modifications in the construction of the fittings to adapt them to different uses other than those specifically mentioned, may be made without departing from the principle and scope of the invention as defined in the following claims.

I claim:

1. A fitting for tubular structures formed with a socket having inwardly inclined ribs on its outer wall and a core having inwardly inclined ribs opposite the recesses between the ribs on the outer wall, said ribs being adapted when the fitting is forced axially upon the end of a pipe, to flute and bend said end into interlocking engagement with the fitting.

2. A fitting for use with tubular structures and having a socket formed with an opening of such size and shape as to permit an end portion of a tubular structure to be freely introduced into the socket for a slight extent at least, a core integral with the socket and disposed in spaced relation to the wall thereof, said socket and said core having cooperable inwardly converging camming surfaces inclining inwardly toward the axis and closed end of the socket and operable to engage and bend the end portion of the tubular structure laterally into permanent interlocking engagement with the fitting when the end portion of the tubular structure is forced into the socket.

In witness whereof I hereto affix my signature.

HENRY BRYANT.